United States Patent [19]

Andersson

[11] Patent Number: 5,123,313
[45] Date of Patent: Jun. 23, 1992

[54] TORSION SOCKET

[75] Inventor: Svante Andersson, Malmköping, Sweden

[73] Assignee: AB Momento, Flen, Sweden

[21] Appl. No.: 631,650

[22] Filed: Dec. 21, 1990

[51] Int. Cl.$^5$ .................. B25B 23/159; B25B 13/06
[52] U.S. Cl. ......................... 81/477; 81/121.1
[58] Field of Search ............ 81/467, 472, 477, 177.6, 81/121.1, 64, DIG. 5; 116/200, 284, 233, DIG. 21

[56] References Cited

U.S. PATENT DOCUMENTS 4,099,480 7/1978 Loustaunau .................. 116/284 X

FOREIGN PATENT DOCUMENTS 0287702 10/1988 European Pat. Off. ........... 81/121.1
2254403 7/1975 France ........................... 81/477
1496524 12/1977 United Kingdom ............. 81/121.1
1521461 8/1978 United Kingdom .

Primary Examiner—D. S. Meislin
Attorney, Agent, or Firm—Bradford E. Kile

[57] ABSTRACT

A torsion socket includes a longitudinally extending torsion shaft and a nut socket fashioned at one end of the torsion shaft. The nut socket has a recess for receiving a wheel nut to be tightened about a threaded bolt. A driver head is integrally fashioned with the other end of the torsion shaft and has a recess which is square in cross section for engaging the drive shaft of an impact wrench. Rotation indicia are fashioned on an exterior portion of the nut socket to permit an operator who is tightening a wheel nut to facilely visually determine when the torsion shaft relieves the impact torque from the nut socket and when the nut socket stops turning, preventing overtightening of the wheel nut beyond design specification in the secondary market.

10 Claims, 2 Drawing Sheets

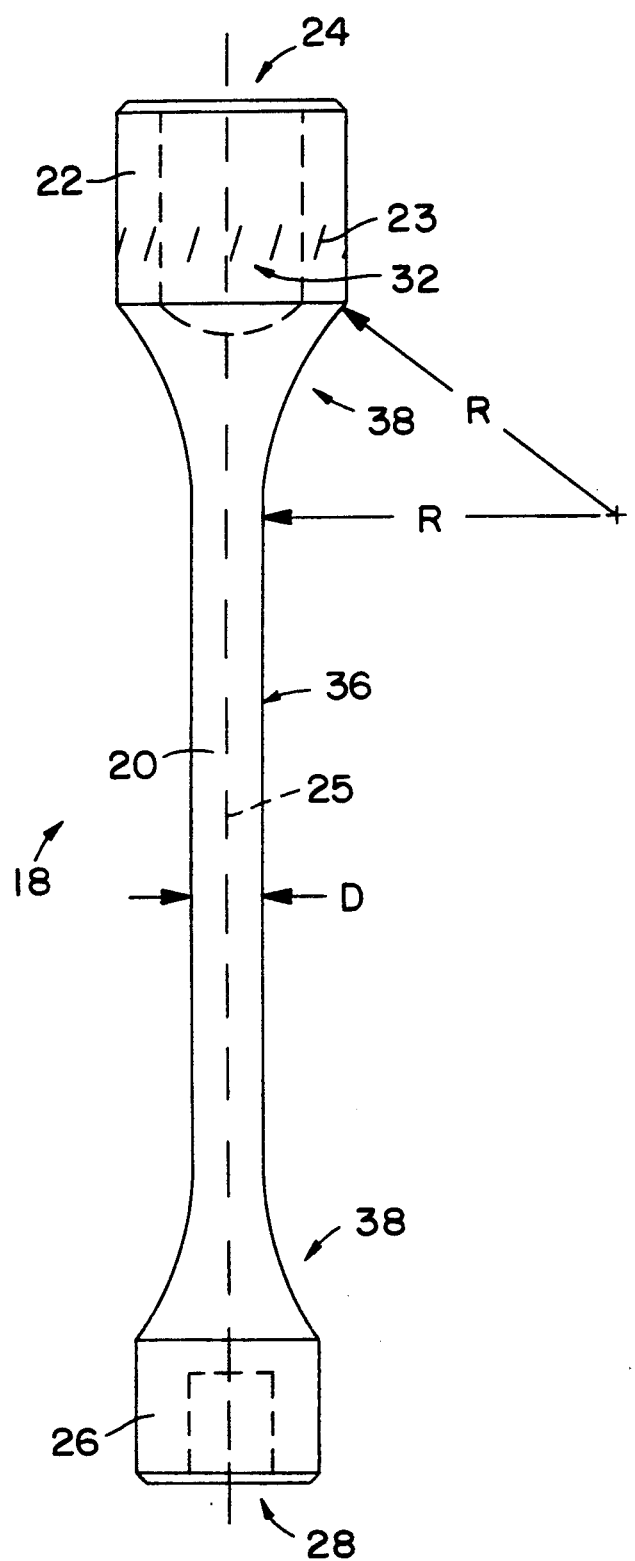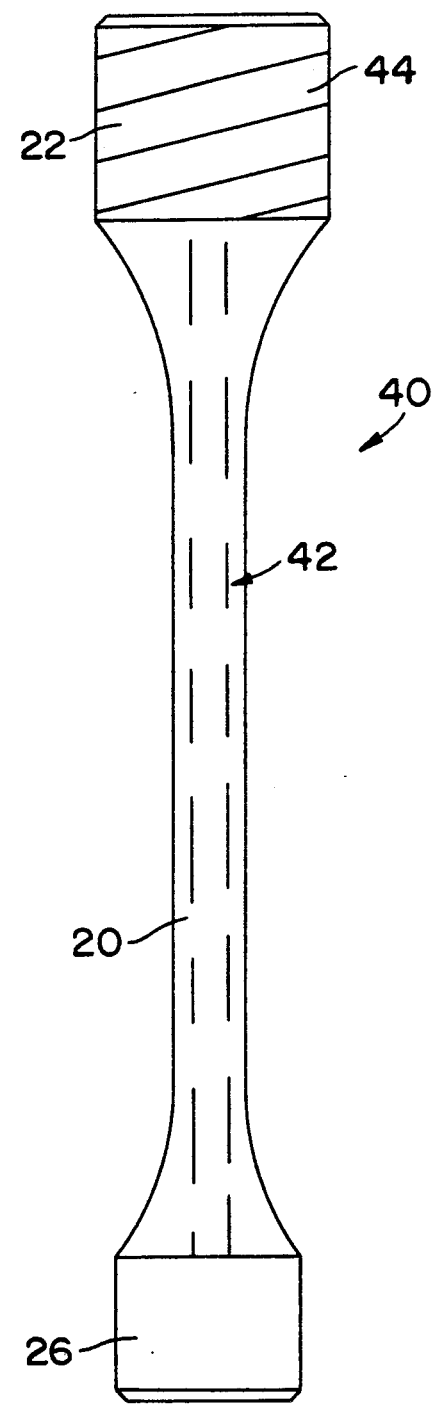
FIG. 2
FIG. 5

TORSION SOCKET

BACKGROUND OF THE INVENTION

This invention relates to a novel torsion socket for use in tightening wheel nuts for automobiles, lorries and the like. More specifically, this invention relates to a torsion socket for use with an impact wrench to limit the tightening torque applied to wheel nuts, and the like, during secondary or after market changing or rotation of tires or repairing brakes where a tire must be removed and remounted.

The design specification with respect to torque to be applied to a lug nut for original equipment can vary significantly; depending on the size and design of a vehicle. During initial installation, rather elaborate machines run-up nuts to design tolerances. However, in an after market environment elaborate units are not practical and are replaced by a standard power-operated hand tool or impact wrench and a variety of socket sizes.

Various types of sockets have been used in the past with impact wrenches to facilitate mounting a wheel on an axle. Typically, one end of a socket is directly mounted to the drive shaft of an impact wrench and the other end of the socket engages a wheel nut. During operation, an impact wrench, acting through an internal clutch, delivers rapid turning blows to the wheel nut to tighten the wheel nut about a threaded hub bolt. Each blow of the impact wrench partially rotates the wheel nut so that the nut is rapidly tightened in increments with rotational force at impact being at a maximum and then rapidly decaying to zero until the next blow.

With conventional impact wrenches and hand connected sockets, an operator attempts to determine when the wheel nut has been adequately tightened by listening to the sound of the impact wrench and slippage of the impact wrench internal clutch. In this connection at least some believe that a skilled operator can audibly distinguish the sound of a wheel nut being rotated from the sound of the wheel nut resisting rotation. However, by the time an operator can audibly detect the sound of clutch slippage, torque on a wheel nut has already exceeded engineering specifications.

Although impact wrenches are fairly simple to operate, a conventional impact wrench gives a high torque to a hard joint such as a wheel nut. The high impact force delivered to a wheel nut using a standard impact socket, combined with an operator's inability to visually or audibly determine when manufactures design specification for torque has achieved usual results in overtightening the nut. Since modern car wheel rims may be with rather thin elements, it is possible to deform the tire rim by overtightening a wheel nut. In some instances, overtightening a wheel nut may even shear an associated hub bolt.

In addition to the above mentioned problems, overtightening a wheel nut can misalign a wheel with respect to an axle because the overtightened portion of the wheel hub will be canted inward relative to the axle. Misalignment of a wheel can impede the performance of the vehicle and result in rapid tire wear and/or poor steering control. Still further over tightening can adversely affect brake pad wear on disc brake systems.

Another significant problem caused by overtightened wheel nuts is that, as a tightening force is applied to the wheel nut, the associated hub bolt absorbs some of the extra impact force and may transfer the force to points of contact with the wheel hub. In some instances over tightening can result in deforming the bolt-receiving holes in a wheel. If the bolt-receiving holes are deformed, the wheel cannot be exactly centered about the axle which, again, decreases vehicle performance.

In order to reduce the torsion force delivered to the wheel nut, torque sockets have been introduced. Torque sockets are made of metals having elastic properties so that excess torsion force is distributed along the socket itself and not delivered to the wheel nut. The stem or waistline of the torque socket acts as a torsion spring and absorbs the excess power of an impact wrench. Once a wheel nut is adequately tightened, a driver end of the torque socket continues to turn with each blow of the impact wrench, while the nut end stops rotating. The elastic properties of the torque socket enables the drive end to spring back between each blow and/or store rotation as spring energy. An example of a prior torque limiting spanner is disclosed in U.K. patent No. 1 521 461 of common assignment with the instant application.

Although torque sockets of the type described above provide a marked improvement over hard drive systems and have achieved considerable commercial attention, previously known torque sockets may not always sufficiently absorb rapidly repeated blows of an impact wrench. Since a user cannot visually determine when nut tightening is complete, blows which are not adequately absorbed by the torsion socket may be transmitted to the nut and damage the associated wheel bolt, tire hub, or rim. As stated in the preceding, these problems can become exacerbated as more sophisticated, thinner wheels are utilized. Still further, torsion strength and structural integrity of previously known torsion sockets is relevant when attempting to accommodate elongated or domed lug nuts.

The difficulties suggested in the preceding are not intended to be exhaustive but rather are among many which may tend to reduce user satisfaction with prior torque sockets. Other noteworthy problems may also exist; however, those presented above should be sufficient to demonstrate that torsion sockets appearing in the past will admit to worthwhile improvement.

OBJECTS AND BRIEF SUMMARY OF THE INVENTION

Objects

It is therefore a general object of the invention to provide a novel torsion socket which will obviate or minimize difficulties of the type previously described.

It is a specific object of the invention to provide a torsion socket which permits an operator to facilely determine when a wheel nut has been tightened to manufacturer's design specifications.

It is another object of the invention to provide a torque socket which absorbs torsion force from an impact wrench to prevent overtightening a wheel nut.

It is yet a further object of the invention to provide a torsion socket of optional torsion design characteristics.

It is still another object of the invention to provide a torsion socket which is inexpensive to manufacture and easy to use.

BRIEF SUMMARY OF A PREFERRED EMBODIMENT OF THE INVENTION

A preferred embodiment of the invention which is intended to accomplish at least some of the foregoing objects includes a torsion socket having a longitudinally extending torsion shaft and a nut socket fashioned at one end of the torsion shaft. The nut socket has a recess which is coaxial with a central longitudinal axis of the torsion shaft. The nut socket recess includes multiple flats which extend parallel to the central axis of the recess and define a hexagon configuration in cross section for receiving a wheel nut to be tightened about a threaded bolt. A driver head is integrally fashioned to the other end of the torsion shaft and has a recess which is square in cross section for engaging the drive shaft of an impact wrench. Unique indicia are fashioned on an exterior portion of the nut socket to permit an operator who is tightening a wheel nut to facilely and accurately determine when the torsion shaft relieves jarring impulse torque from the nut to prevent overtightening of the wheel nut.

THE DRAWINGS

Other objects and advantages of the present invention will become apparent from the following detailed description of a preferred embodiment thereof taken in conjunction with the accompanying drawings, wherein:

FIG. 2 is a side view of a torsion socket in accordance with a preferred embodiment of the subject invention;

FIG. 5 is a side view of an alternate preferred embodiment of the subject invention.

DETAILED DESCRIPTION

Figure 1:
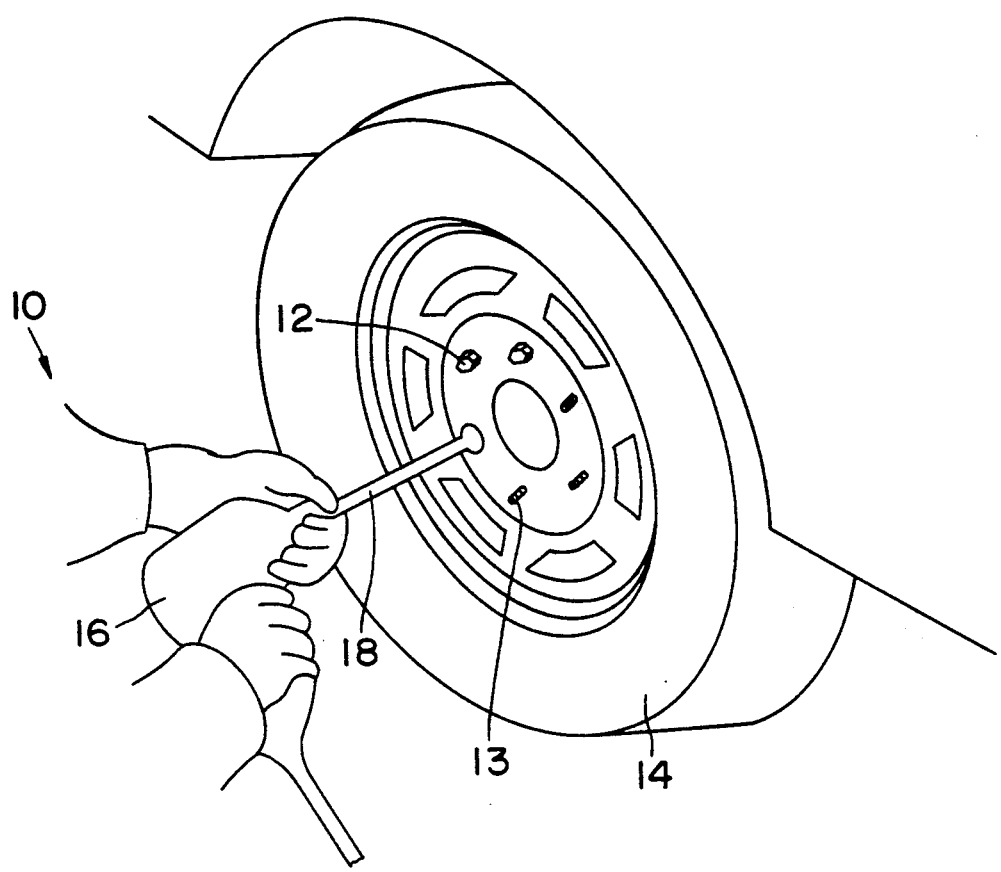
FIG. 1 is an axonometric view disclosing the context of the subject invention and depicts an operator tightening wheel nuts using an impact wrench and a torsion socket in accordance with a preferred embodiment of the invention.

Referring now to the drawings, wherein like numerals indicate like parts, and initially to FIG. 1, there will be seen an operative context of the subject invention. More particularly, an operator 10 is shown tightening wheel nuts 12 onto threaded hub bolts 13 of a wheel 14. The operator is using a power operated hand tool known as an impact wrench 16 having a drive shaft which is engaged with a torsion socket 18 of the present invention. Here, the subject torsion socket 18 is shown partially rotated in response to a blow of the impact wrench 16. The rotational motion distributes excess impact force along the length of the subject torsion socket, as will be described in more detail below.

Impact wrenches are hand operated and designed with internal torque transmitting couplings or clutches. However, a torsion wrench is capable of driving, a nut with considerable torsion impact into mated engagement with a seat on a wheel rim.

FIG. 2 is a side view of the subject torque socket 18. The torsion socket 18 has a torsion shaft 20 and a nut socket 22 integral with one end of the torsion shaft 20. A recess 24 is fashioned within a distal end of the nut socket 22 for operably receiving a wheel nut to be tightened about a threaded hub bolt. The recess 22 is coaxial with the torsion shaft 20 such that their respective longitudinal axes 25 are colinear.

The nut socket 22 has a plurality of marks or cuts 23 which are canted or angled with respect to the axis 25. These visually indicate when the torque socket has tightened a wheel nut to design specifications. In this, when the nut socket is rotating the band 23 will appear as a blur. However when the maximum designed torque is achieved, as designed into the torsion shaft 20, the head 22 will stop rotating and the band will appear as discrete cuts.

Figure 3:
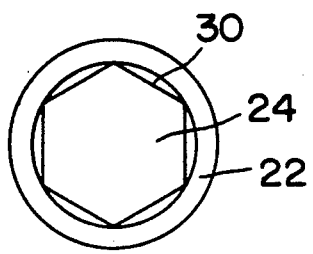
FIG. 3 is an end view of the subject torsion socket looking at a top end as depicted in FIG. 2.

The recess 24 of the nut socket 22 has six nut flats 30 which extend parallel to an imaginary central longitudinal axis 25 of the recess. As shown in FIG. 3, the nut flats 30 form a hexagon configuration in cross-section. The recess 24 is configured to intimately engage corresponding wrench flats of a standard wheel nut. The recess 24 also includes an arcuate interior dome 32 extending inwardly toward the torsion shaft 20 for accommodating a corresponding dome on a wheel nut.

Figure 4:
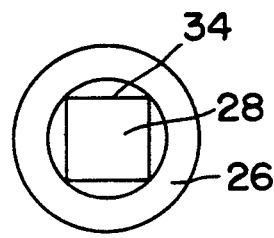
FIG. 4 is an opposite end view of the subject torsion socket looking at the bottom end as viewed in FIG. 2.

A driver end 26 is integrally fashioned at the other end of the torsion shaft 20 and has a recess 28 for operably receiving the drive shaft of an impact wrench. As shown in FIG. 4, the recess 28 of the driver head 26 has four wrench flats 34 which form a square in cross-section. The recess 26 is configured to receive the drive shaft of an impact wrench and is axially aligned with the torsion shaft 20 along imaginary longitudinal axis 25.

Referring again to FIG. 2, the torsion shaft 20 has a uniform cross-section along a central portion of the shaft 20, generally designated 36. The torsion shaft 20 is composed of spring steel and is designed in composition and diameter to provide elastic, torsion properties and a limiting torque on a nut in accordance with design specifications for a given nut and wheel size and configuration.

Transition shoulders 38 arcuately extend between the central portion 36 of the torsion shaft and the nut socket 2 for transmitting torsion from the torsion shaft to the nut socket. The transition shoulders 38 are configured such that a radius of curvature along the curve of the transition shoulders is greater than twice the diameter of the central portion 36 of the torsion shaft 20. As illustrated in FIG. 2, the radius of curvature "R" is greater than twice the diameter "D" of the torsion shaft. The gradual curve of the transition shoulders 38 strengthens the area of the torque socket adjacent the socket end 22.

In operation, to tighten a wheel nut, the torsion socket 18 is selected to match the design specification of the nut to be run. The torsion socket is then fitted onto a conventional impact wrench and the head 24 is engaged with a nut. The torsion socket is then rotated about its central longitudinal axis by means of a power driven impact wrench engaging the recess 28 of the driver head 26. When the wheel nut and the torque socket are both rotating, the torsion force from the impact wrench is delivered to the wheel nut. Once the wheel nut has been tightened to design specifications, it will resist further rotation. The impact wrench continues to deliver blows to the subject torsion socket, however, the impact force of each excess blow is distributed along the torsion shaft 20, and the torsion shaft partially rotates and counter-rotates in response to the blow. In this manner, the elasticity of the torsion shaft absorbs excess blows of the impact wrench and isolates the nut socket 22 from high torque forces to prevent overtightening of wheel nuts. Almost simultaneously the markings or slanted cuts 23 on the periphery of the nut socket 22 permit a user to visually determine when the nut socket 22 has stopped rotating. The markings 23 create a solid blur line when the nut socket 22 is rotating because the markings blend together to form the blurred image of a band. When the nut socket is no longer rotating, the individual markings will be distinguishable from one another. When individual markings are visually apparent, an operator is signaled to release the rigger on the impact wrench to stop rotation of the power drive.

FIG. 5 shows an alternate preferred embodiment of the subject torsion socket. The torsion socket 40 of FIG. 5 is structurally similar to the torsion socket 18 of FIG. 2 except that, in this alternative embodiment, the cuts 23 are replaced with a spiral groove 44 fashioned about the periphery of socket end 22. The spiral 44 operably serves to visually indicate when socket end 22 slows and stops rotating.

SUMMARY OF THE MAJOR ADVANTAGES OF THE INVENTION

After reading and understanding the foregoing disclosure of the subject torsion socket, in conjunction with the drawings, it will be appreciated that several distinct advantages of the subject invention are obtained.

Without attempting to set forth all of the desirable features of the instant torsion socket, at least some of the major advantages of the invention include a torsion socket having markings fashioned on an exterior peripheral surface of a socket end 22. These markings 23 or 44 visually indicate to an operator when socket end 22 begins to slow and then stop rotating so that the operator may quickly release an impact wrench and prevent overtightening of a wheel nut beyond design specifications.

The subject torque wrench also includes transition shoulders 38 which strengthen the torque socket 18 adjacent the socket end 22.

In describing the invention, reference has been made to a preferred embodiment and illustrative advantages of the invention. Those skilled in the art, however, and familiar with the instant disclosure of the subject invention, may recognize additions, deletions, modifications, substitutions, and other changes which will fall within the purview of the subject invention and claims.

What is claimed is:

1. A torsion socket for use with an impact wrench to tighten wheel nuts, said torsion socket comprising:
   a longitudinally extending torsion shaft having a central longitudinal axis;
   a nut socket integral with one end of said longitudinally extending torsion shaft, said nut socket having a recess fashioned longitudinally into a distal end thereof wherein an imaginary central longitudinal axis of said recess is coaxial with the central longitudinal axis of said torsion shaft, said recess having,
      nut flats extending parallel to the imaginary central longitudinal axis of said recess and defining a regular hexagon configuration in cross section operable to cooperate with and intimately engage corresponding wrench flats upon the exterior peripheral surface of a wheel nut to be tightened by an impact wrench;
   a driver end integral with the other end of said longitudinally extending torsion shaft, said driver end having a recess fashioned longitudinally into a distal end thereof wherein an imaginary central longitudinal axis of said recess is coaxial with the central longitudinal axis of said torsion shaft, said recess having a square cross section corresponding to the square cross section of a drive shaft of an impact wrench; and
   regularly spaced rotation indicia means fashioned integrally on a surface of said nut socket of said torsion socket for permitting an operator tightening of a wheel nut engaged by said nut socket to facilely visually determine when said nut socket stops rotating and said torsion shaft operably relieves impact torque from said nut socket to prevent overtightening of a wheel nut with the impact wrench.

2. A torsion socket for use with an impact wrench to tighten wheel nuts as defined in claim 1 and further including:
   a transition shoulder arcuately extending between said longitudinally extending torsion shaft and said nut socket for transmitting torsion from said torsion shaft to said nut socket.

3. A torsion socket for use with an impact wrench to tighten wheel nuts as defined in claim 2 wherein:
   said transition shoulder has a radius of curvature greater than twice the diameter of said torsion shaft.

4. A torque socket for use with an impact wrench to tighten wheel nuts as defined in claim 1 wherein:
   said nut socket includes an arcuate interior dome fashioned with the base of said recess to operably accommodate a corresponding dome on a wheel nut.

5. A torsion socket for use with an impact wrench to tighten wheel nuts as defined in claim 1 wherein said longitudinally extending torsion shaft comprises:
   a solid steel rod having elastic torsion properties.

6. A torsion socket for use with an impact wrench to tighten wheel nuts, said torsion socket comprising:
   a longitudinally extending torsion shaft having a central longitudinal axis;
   a nut socket integral with one end of said longitudinally extending torsion shaft, said nut socket having a recess fashioned longitudinally into a distal end thereof wherein an imaginary central longitudinal axis of said recess is coaxial with the central longitudinal axis of said torsion shaft, said recess having,
      nut flats extending parallel to the imaginary central longitudinal axis of said recess and defining a regular hexagon configuration in cross section operable to cooperate with and intimately engage corresponding wrench flats upon the exterior peripheral surface of a wheel nut to be tightened by an impact wrench;
   a driver end integral with the other end of said longitudinally extending torsion shaft, said driver end having a recess fashioned longitudinally into a distal end thereof wherein an imaginary central longitudinal axis of said recess is coaxial with the central longitudinal axis of said torsion shaft, said recess having a square cross section corresponding to the square cross section of a drive shaft of an impact wrench; and
   a transition shoulder arcuately extending between said longitudinally extending torsion shaft and said nut socket for transmitting torsion from said torsion shaft to said nut socket, said transition shoulder has a radius of curvature greater than twice the diameter of said torsion shaft; and
   rotation indicia means comprising at least one groove fashioned into a peripheral surface of said nut socket for permitting an operator tightening a wheel nut engaged by said nut socket to facilely, visually determine said nut socket stops rotating and said torsion shaft operably relieves impact torque from said nut socket to prevent overtightening of a wheel nut with the impact wrench.

7. A torsion socket for use with an impact wrench to tighten wheel nuts as defined in claim 6 wherein said rotation indicia means comprises:
a spiral groove fashioned about the periphery of said nut socket.

8. A torsion socket for use with an impact wrench to tighten wheel nuts as defined in claim 6 wherein said rotation indicia means comprises:
a plurality of cuts fashioned into the periphery of said nut socket.

9. A torsion socket for use with an impact wrench to tighten wheel nuts, said torsion socket comprising:
a longitudinally extending torsion shaft having a central longitudinal axis;
a nut socket integral with one end of said longitudinally extending torsion shaft, said nut socket having a recess fashioned longitudinally into a distal end thereof wherein an imaginary central longitudinal axis of said recess is coaxial with the central longitudinal axis of said torsion shaft, said recess having,
nut flats extending parallel to the imaginary central longitudinal axis of said recess and defining a regular hexagon configuration in cross section operable to cooperate with and intimately engage corresponding wrench flats upon the exterior peripheral surface of a wheel nut to be tightened by an impact wrench;
a driver end integral with the other end of said longitudinally extending torsion shaft, said driver ned having a recess fashioned longitudinally into a distal end thereof wherein an imaginary central longitudinal axis of said recess is coaxial with the central longitudinal axis of said torsion shaft, said recess having a square cross section corresponding to the square cross section of a drive shaft of an impact wrench; and
regularly spaced rotation indicia means fashioned on an exterior portion of said nut socket for permitting an operator tightening a wheel nut engaged by said nut socket to facilely visually determine when said nut socket stops rotating and said torsion shaft operably relieves impact torque from said nut socket to prevent overtightening of a wheel nut with the impact wrench, said regularly spaced rotation indicia means comprising,
a plurality of grooves fashioned into a peripheral surface of said nut socket and canted with respect to the central longitudinal axis of said torsion shaft.

10. A torsion socket for use with an impact wrench to tighten wheel nuts, said torsion socket comprising:
a longitudinally extending torsion shaft having a central longitudinal axis; a nut socket integral with one end of said longitudinally extending torsion shaft, said nut socket having a recess fashioned longitudinally into a distal end thereof wherein an imaginary central longitudinal axis of said recess is coaxial with the central longitudinal axis of said torsion shaft, said recess having,
nut flats extending parallel to the imaginary central longitudinal axis of said recess and defining a regular hexagon configuration in cross section operable to cooperate with and intimately engage corresponding wrench flats upon the exterior peripheral surface of a wheel nut to be tightened by an impact wrench;
a driver end integral with the other end of said longitudinally extending torsion shaft, said driver end having a recess fashioned longitudinally into a distal end thereof wherein an imaginary central longitudinal axis of said recess is coaxial with the central longitudinal axis of said torsion shaft, said recess having a square cross section corresponding to the square cross section of a drive shaft of an impact wrench; and
regularly spaced rotation indicia means fashioned on an exterior portion of said nut socket for permitting an operator tightening a wheel nut engaged by said nut socket to facilely visually determine when said nut socket stops rotating and said torsion shaft operably relieves impact torque from said nut socket to prevent overtightening of a wheel nut with the impact wrench, said regularly spaced rotation indicia means comprising,
a spiral groove fashioned about the periphery of said nut socket.

* * * * *